US009442557B2

(12) United States Patent
Arora et al.

(10) Patent No.: US 9,442,557 B2
(45) Date of Patent: Sep. 13, 2016

(54) USING A LINEAR PREDICTION TO CONFIGURE AN IDLE STATE OF AN ENTITY IN A COMPUTING DEVICE

(71) Applicant: Advanced Micro Devices, Inc., Sunnyvale, CA (US)

(72) Inventors: Manish Arora, Dublin, CA (US); Nuwan S. Jayasena, Sunnyvale, CA (US); Yasuko Eckert, Kirkland, WA (US); Madhu Saravana Sibi Govindan, Austin, TX (US); William L. Bircher, Austin, TX (US); Michael J. Schulte, Austin, TX (US); Srilatha Manne, Portland, OR (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 233 days.

(21) Appl. No.: 14/075,645

(22) Filed: Nov. 8, 2013

(65) Prior Publication Data

US 2014/0149772 A1    May 29, 2014

Related U.S. Application Data

(60) Provisional application No. 61/730,614, filed on Nov. 28, 2012.

(51) Int. Cl.
    *G06F 1/32*    (2006.01)
    *G06F 1/20*    (2006.01)
(52) U.S. Cl.
    CPC ............. *G06F 1/3234* (2013.01); *G06F 1/206* (2013.01)
(58) Field of Classification Search
    CPC ....... G06F 1/3296; G06F 1/3206; G06F 1/26
    USPC ........................................ 713/300, 323, 322
    See application file for complete search history.

(56) References Cited

U.S. PATENT DOCUMENTS

| 2001/0031000 A1* | 10/2001 | Nguyen | H03H 21/0012 375/231 |
| 2009/0150695 A1* | 6/2009 | Song | G06F 1/3203 713/323 |
| 2009/0150696 A1* | 6/2009 | Song | G06F 1/3203 713/323 |
| 2010/0218019 A1* | 8/2010 | Eckhard | G06F 1/3203 713/322 |
| 2011/0060924 A1* | 3/2011 | Khodorkovsky | G06F 1/3287 713/300 |
| 2011/0261948 A1* | 10/2011 | Deng | H04B 3/23 379/406.08 |
| 2013/0051498 A1* | 2/2013 | Taft | G01R 19/2513 375/340 |

OTHER PUBLICATIONS

Z. Hu, A. Buyuktosunoglu, V. Srinivasan, V. Zyuban, H. Jacobson, and P. Bose, Microarchitectural Techniques for Power Gating of Execution Units, Proceedings of International Symposium on Low Power Electronics and Design, Aug. 2004.
Advanced Micro Devices, BIOS and Kernel Developers Guide (BKDG) for AMD Family 15h Models 00h-0Fh Processors, Jan. 2012.
J. Makhoul, Linear Prediction: A Tutorial Review, Proceedings of the IEEE, vol. 63, No. 4, pp. 561-580, Apr. 1975.

* cited by examiner

*Primary Examiner* — Kim Huynh
*Assistant Examiner* — Justin T Ahn
(74) *Attorney, Agent, or Firm* — Park, Vaughan, Fleming & Dowler LLP

(57) ABSTRACT

The described embodiments include a computing device with one or more entities (processor cores, processors, etc.). In some embodiments, during operation, a thermal power management unit in the computing device uses a linear prediction to compute a predicted duration of a next idle period for an entity based on the duration of one or more previous idle periods for the entity. Based on the predicted duration of the next idle period, the thermal power management unit configures the entity to operate in a corresponding idle state.

15 Claims, 2 Drawing Sheets

USING A LINEAR PREDICTION TO CONFIGURE AN IDLE STATE OF AN ENTITY IN A COMPUTING DEVICE

RELATED CASES

This application is a non-provisional application from, and hereby claims priority under 35 U.S.C. §119 to, U.S. provisional patent application No. 61/730,614, which is titled "Effective Power Gating Through Idle Period Entry and Exit Prediction," by Manish Arora, Yasuko Eckert, Indrani Paul, Nuwan Jayasena, Madhu Saravana Sibi Govindan, William Lloyd Bircher, Srilatha Manne, Michael Schulte, and Dean Tullsen, which was filed on 28 Nov. 2012, and which is incorporated by reference.

BACKGROUND

1. Field

The described embodiments relate to computing devices. More specifically, the described embodiments relate to using a linear prediction to configure an idle state of an entity in a computing device.

2. Related Art

In many computing devices, entities (i.e., processors, processor cores, etc.) encounter idle periods, which are periods of time during which an entity is idle and does not complete computational operations. During idle periods, some of these entities select an idle state from a set of idle states and transition to the selected idle state to conserve power. For such entities, each idle state in the set of idle states has different settings for one or more operating parameters (e.g., voltages, clock frequencies, etc.) for one or more parts of the entity. For example, in some idle states, one or more controlling clocks can be reduced in frequency or halted to one or more of processing circuits, interrupt circuits, interface circuits, etc. for the entity. As another example, in some idle states, one or more input voltages can be reduced (possibly to 0V) to one or more of processing circuits, interrupt circuits, interface circuits, etc. for the entity. Some of these entities use at least some of the idle states from a well-known set of states that includes states C0-C6.

In these computing devices, transitioning an entity into and back out of some of the idle states incurs delay due to operations that are performed to enable the transition. For example, for entities that support the C0-C6 states, when transitioning from the C0 state (full power) to the C6 idle state (deep power down) a delay is incurred because architectural state such as values in registers, values in caches, state variables, etc. must be preserved by writing the architectural state to a memory (e.g., to disk, to a memory, to a lower-level cache, and/or to another location) before one or more voltages in the entity are reduced to a level lower than the level required to maintain the architectural state within the entity. As another example, when transitioning from the C6 idle state to the C0 state a delay is incurred because, after the one or more voltages are restored to levels sufficient to maintain the architectural state within the entity, preserved architectural state such as values for registers, etc. must be recovered from the memory and used to set architectural state for the entity.

Because transitioning into and back out of some idle states incurs delays, making such a transition can cause inefficient operation for the entity (and, more generally, the computing device) when the transition is made at the wrong time. For example, if an idle period is shorter than a given duration, the delay incurred for making the transitions into and back out of the idle state can be longer than the idle period, meaning that the transition results in unnecessary delay for the entity. In addition, the transition to the idle state has a cost in terms of power expended to transition into and back out of the idle state. If the idle period is not sufficiently long, the power conserved by entering the idle state can be exceeded by the power expended to transition into and back out of the idle state.

BRIEF DESCRIPTION OF THE FIGURES

Throughout the figures and the description, like reference numerals refer to the same figure elements.

DETAILED DESCRIPTION

Figure 1:
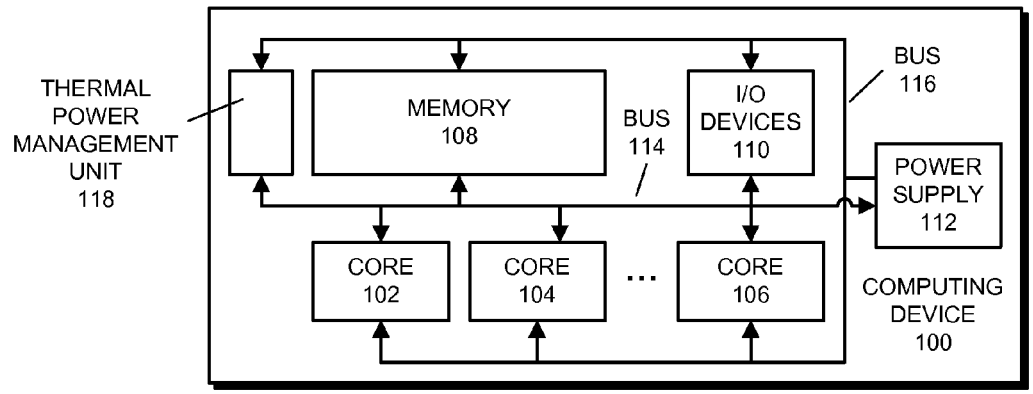
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Terminology

In the following description, various terms may be used for describing embodiments. The following section provides a simplified and general description of some of these terms. Note that some or all of the terms may have significant additional aspects that are not recited herein for clarity and brevity and thus these descriptions are not intended to limit the terms.

Entities: entities include a portion of the hardware in a computing device and/or software executing on a computing device that can perform the operations herein described. For example, entities can include, but are not limited to, one or more processors (e.g., central processing units (CPUs), graphics processing units (GPUs), accelerated processing units (APUs), etc.), one or more processor cores (e.g., CPU cores, GPU cores, etc.) and/or one or more threads executing on one or more CPU cores, APU cores, or GPU cores, a compute unit in a core, an application specific integrated circuits (ASIC), a microcontroller, a digital signal processor, a thread executing on a processing circuit, or some combination thereof.

Architectural state: the architectural state of an entity in a computing device (e.g., a processor, a processor core, etc.) includes data and information stored/held in the entity that may be used by other entities in the computing device (e.g., accessed, read, overwritten, modified, etc.). Generally, the data and information comprises any type(s) of data and information held in the entity that can be used by other entities, such as data stored in memories and/or caches, data stored in registers, state information (flags, values, indicators, etc.), etc.

Overview

The described embodiments include a computing device with entities that encounter idle periods while performing computational work. Idle periods are generally periods of time during which an entity should not or does not perform computational work. In these embodiments, the computing device determines idle states to which entities transition during idle periods (idle states are described in more detail below). More specifically, during operation, a controller in the computing device (e.g., a thermal power management unit) computes a predicted duration of a next idle period for an entity based on the durations of previous idle periods. The controller then uses the predicted duration of the idle period to determine an idle state to which the entity is to transition during the idle period.

In some embodiments, the controller uses a linear prediction to compute the predicted duration of the idle period based on the durations of the previous idle periods. Generally, using the linear prediction includes computing a result of a corresponding mathematical function, with the result of the mathematical function used as the predicted duration. To enable computing the result of the linear prediction, a set of prediction coefficients that are used in the mathematical function are computed based on durations for the previous idle periods.

In some embodiments, the controller uses one or more thresholds for idle period duration to determine the idle state in which the entity is to operate during the next idle period. In these embodiments, each of the thresholds is associated with at least one corresponding idle state. To use the thresholds, after computing the predicted duration for the next idle period, the controller determines which of the thresholds is best met by the predicted duration and then determines that the entity is to operate in an associated idle state during the next idle period. For example, in these embodiments, based on the thresholds, if the predicted duration of the idle period is not long enough, during the next idle period, the entity may be transitioned to an idle state for which architectural state is maintained in the entity, instead of being transitioned into a idle state where architectural state is lost in the entity (e.g., by reducing one or more voltages for the entity below a state-sustaining voltage, etc.). In this way, for idle periods that are predicted to be of shorter duration, the entity need not preserve the architectural state (e.g., copy values in registers, values in caches, state variables, etc. to disk, to a memory, to a lower-level cache, and/or to another location) before transitioning to the idle state, which can help conserve power and avoid delay.

By using the predicted duration of a next idle period to determine the idle state in which the entity operates, the described embodiments can avoid the entity transitioning to and from certain idle states during idle periods that are shorter than the delay involved in transitioning to and from the idle states and/or for which the power consumed in preserving architectural state is greater than the power saved by transitioning to the idle state. This can in turn improve the operation of the computing device. By using the linear prediction to compute the predicted duration, the described embodiments can more accurately compute the duration of idle periods, which can improve the accuracy of the decision regarding the idle state in which the entity is to operate.

Computing Device

FIG. 1 presents a block diagram illustrating a computing device 100 in accordance with some embodiments. As can be seen in FIG. 1, computing device 100 includes core 102-106, memory 108, input-output (I/O) devices 110, power supply 112, buses 114 and 116, and thermal power management unit 118. Cores 102-106 are functional blocks such as one or more of CPU cores, GPU cores, ASICs, microcontrollers, programmable logic devices, embedded processors, etc. that are configured to perform computational operations in computing device 100. For example, in some embodiments, cores 102 and 104 are CPU cores and core 106 is a GPU core.

Memory 108 is a functional block that includes memory circuits, control circuits, etc. that form a "main memory" in and for computing device 100. Memory 108 is used by functional blocks such as cores 102-106, I/O devices 110, etc. for storing instructions and data that are used for performing computational operations in computing device 100. In some embodiments, memory 108 includes memory circuits such as one or more of static random access memory (SRAM), dynamic random access memory (DRAM), double data rate synchronous DRAM (DDR SDRAM), and/or other types of memory circuits.

I/O devices 110 is a functional block that includes circuits for performing various types of input and/or output from computing device 100. In some embodiments, I/O devices 110 includes hardware (circuits, elements, etc.) and software (firmware, program code, etc.) for communicating with, controlling, configuring, and/or otherwise handling disk drives, human-interface devices, display monitors, network connections, printers, peripherals, and/or other devices associated with computing device 100.

Power supply 112 is a functional block that is configured to provide electrical power to other functional blocks such as cores 102-106, memory 108, etc. in computing device 100. In some embodiments, power supply 112 includes circuits that receive power signals from a source (e.g., a wall plug, a battery, etc.) at a corresponding voltage and current and generate therefrom various voltages and currents to be used to provide power to the other functional blocks in computing device 100.

Computing device 100 also includes various signal lines, busses, electrical connections, proximity connections, optical connections, etc. that are used by the functional blocks for communicating with one another. For example, in some embodiments, cores 102-106, memory 108, I/O devices 110, power supply 112, and thermal power management unit 118 may use one or more busses such as bus 114 to communicate between one another. In these embodiments, each of the one or more buses may include any number of signal paths (e.g., electrical connections such as wires and pads, conductive or capacitive connections, optical channels, etc.) that are used for communicating between the functional blocks. As another example, power supply 112 may use a bus such as bus 116 for communicating various power signals (i.e., signals of corresponding currents and voltages) to other functional blocks in computing device 100.

Thermal power management unit 118 is a functional block that performs operations for ensuring that entities in computing device 100 (e.g., one or more of cores 102-106, etc.) operate within thermal thresholds (e.g., so that entities operate at temperatures lower than one or more corresponding thresholds/limits, etc.). These operations can include operations such as throttling entities by reducing clock frequencies, voltages, etc. to avoid the entities exceeding thermal thresholds (e.g., due to resistive heating, etc.) in the entity. In some embodiments, thermal power management unit 118 is configured to select an idle state into which an entity is to transition during a next idle period based on a predicted duration of an idle period for the entity. In these embodiments, thermal power management unit 118 computes a predicted duration of the next idle period using a linear prediction. Thermal power management unit 118 then uses the predicted duration to determine an idle state to which the entity is to transition during the next idle period and causes the entity to transition to the idle state during the next idle period.

Although an embodiment is described with an particular arrangement of cores 102-106, some embodiments include a different number and/or arrangement of cores (as shown by the ellipsis in FIG. 1). For example, some embodiments have two, five, eight, or another number of cores. Generally, the described embodiments can use any arrangement of cores that can perform the operations herein described.

In addition, although various functional blocks are shown in FIG. 1, some embodiments include more or fewer functional blocks. For example, in some embodiments, some or all of thermal power management unit 118 is included within another functional block within computing device 100 (e.g., within cores 102-106, etc.), so that one or more functional blocks have a separate thermal power management unit 118. As another example, in some embodiments, some or all of thermal power management unit 118 is separate from computing device 100. Generally, computing device 100 includes sufficient functional blocks to perform the operations herein described.

Moreover, computing device 100 is simplified for illustrative purposes. In some embodiments, computing device 100 includes additional functional blocks, mechanisms, buses, etc. for performing the operations herein described and other operations. For example, computing device 100 may include power systems (batteries, plug-in power sources, etc.), caches, mass-storage devices such as disk drives or large semiconductor memories, media processors, input-output mechanisms, communication mechanisms, networking mechanisms, display mechanisms, communication buses, power buses, etc.

Computing device 100 may be included in or may be any of various electronic devices. For example, computing device may be included in or be a desktop computer, a server computer, a laptop computer, a tablet computer, a smart phone, a toy, an audio/visual device (e.g., a set-top box, a television, a stereo receiver, etc.), a piece of network hardware, a controller, and/or another electronic device or combination of devices.

Idle States

As described above, in some embodiments, entities in computing device 100 (e.g., cores 102-106 and/or other entities) may encounter idle periods during which the entities are idle and thus should not or do not complete computational work. To conserve power, during the idle period, an entity may transition into an idle state from a set of idle states. The entity may then transition back out of the idle state (e.g., to a full-power state) when the idle period is over. Each idle state in the set of idle states has corresponding settings for one or more operating parameters for the entity (e.g., voltages, controlling clock frequencies, currents, input-output limits, etc.). For example, in some idle states, one or more controlling clocks can be reduced in frequency or halted to one or more parts of the entity (e.g., processing circuits, interrupt circuits, interface circuits, etc.). As another example, in some idle states, one or more input voltages can be reduced (possibly to 0V) for one or more parts of the entity (e.g., processing circuits, interrupt circuits, interface circuits, etc.). For instance, the entity may be logically or physically partitioned into various domains, such as clock domains, voltage domains, etc., so that a portion of the circuits in the entity are controlled by a corresponding clock signal, supplied with a separate voltage signal, etc. In these embodiments, each domain may (or may not) have the corresponding clock frequency, voltage, etc. reduced in an idle state. In some embodiments, the idle states include at least some of the well-known "c-states," C0-C6.

In some embodiments, for at least one of the idle states, an entity is configured to set at least one operating parameter (e.g., voltage, current, clock frequency, etc.) for circuits (e.g., register files, caches, memory elements, dynamic circuits, etc.) that maintain at least some of the architectural state of the entity to a level that is insufficient to maintain the architectural state. For example, in some embodiments, for at least one idle state, the entity is configured to set a voltage to a level sufficiently low (e.g., 0V) that circuits in which architectural state is stored can no longer store the architectural state. In order to transition to such an idle state, and assuming that the entity is to subsequently use the architectural state on transitioning back out of the idle state, the entity first preserves an architectural state of the entity to avoid losing the architectural state. Generally, preserving the architectural state includes performing operations to enable recovering the architectural state of the entity upon exiting the idle state. For example, the entity may flush caches in the entity (i.e., write modified data to a lower-level cache, memory 108, a disk or large semiconductor memory, etc.), copy values of registers, flags, state elements, memories, etc. to a memory associated with the entity (e.g., a dedicated memory, a lower level cache, memory 108, a disk or large semiconductor memory, etc.), and/or otherwise preserve the architectural state. Note that, in such idle states, preserving the architectural state causes a delay when transitioning into the idle state and recovering the architectural state causes a delay when transitioning back out of the idle state. In some embodiments, an idle state for which architectural state is preserved before transitioning to the idle state is the C6 idle state.

Linear Prediction

In the described embodiments, predicted durations of idle periods are computed using linear prediction. Generally, linear prediction is a mathematical technique that is used to estimate future events of a discrete time series of events as a linear function of prior events. Thus, considering a series of idle periods for an entity in computing device 100 (e.g., one of cores 102-106, etc.) as the discrete time series, the described embodiments estimate a duration of a next idle period for the entity as a linear function of the previous idle periods. In some embodiments, a sequence of idle period durations observed for an entity is expressed as a discrete time series Y( ), where Y(i) represents the duration of the $i_{th}$ idle event. Thus, given observed values for the durations of previous idle periods Y(1) through Y(n−1), the predicted duration of the nth idle event for the entity, $\overline{Y}(n)$, is expressed as follows:

$$\overline{Y}(n) = \sum_{i=1}^{N} a(i) * Y(n-i),$$

where $\overline{Y}(n)$ is the predicted duration of the idle period, each Y(n−i) is a duration of a previous idle period, and each a(i) is a prediction coefficient for a corresponding previous idle period.

As can be seen in the expression above, each previous idle period duration is multiplied by a corresponding prediction coefficient a(i) that weights the previous idle period for the summation operation—so that the previous idle period contributes proportionally to the predicted duration of the idle period. In some embodiments, the prediction coefficients are dynamically (i.e., at runtime for the entity) computed by selecting the prediction coefficients to minimize a prediction error over a series of previous idle period durations. In some embodiments, a closed-form solution (e.g., Levinson-Durbin, Yule-Walker, etc.) may be used to determine the prediction coefficients based on the durations of previous idle periods. However, and more generally, the described embodiments may use any linear predictive method or methods to determine or derive the prediction coefficients.

In some embodiments, at the end of an idle period, the actual value of the idle period duration is determined and the prediction coefficients are updated (i.e., recomputed) using the idle period duration and previous idle period durations. Thus, in these embodiments, the prediction coefficients are updated after each idle period. However, in some embodiments, the prediction coefficients are updated less often than after each idle period. For example, the prediction coefficients may be updated every mth idle period, where m is, e.g., 3, 23, 128, etc. Between updates, previously-computed prediction coefficients are used for the linear prediction. In these embodiments, by updating the prediction coefficients less often, the computational burden of computing the prediction coefficients is reduced. To avoid prediction errors that may be introduced by less-frequently updating prediction coefficients, in some of these embodiments, prediction errors may be tracked and in (i.e., the number of idle periods between updated prediction coefficients) may be dynamically configured (i.e., increased or reduced) to reduce the prediction errors.

In some embodiments, a number of linear prediction coefficients and/or the number of idle periods in the series is selectable, either as a fixed value or as a dynamically adjustable value. For example, in some embodiments, based on prediction accuracy, computational capabilities, etc., a larger or smaller number of prediction coefficients and/or idle period durations may be selected and/or dynamically adjusted. For instance, some embodiments start by using 16 previous idle period durations and 4-8 prediction coefficients, and dynamically adjust the number of idle period durations and/or prediction coefficients to improve prediction accuracy.

Although embodiments are described above that use a particular mathematical expression for computing the linear prediction, in some embodiments, a different mathematical expression is used for computing the linear prediction. Generally, in some embodiment, any mathematical expression that estimates future events of a discrete time series (such as a series of idle period durations) as linear functions of prior observations, given dynamically determined prediction coefficients for prior idle period duration, may be used.

Thermal Power Management Unit

Figure 2:
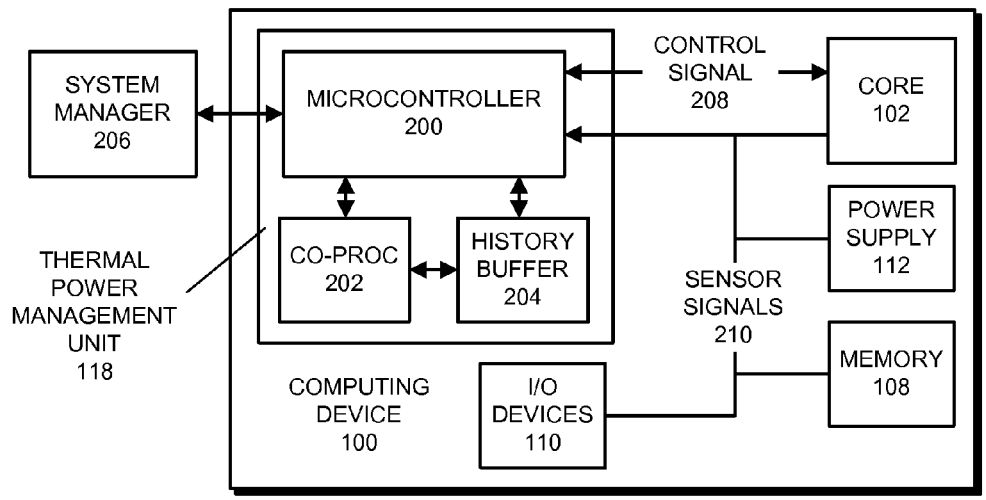
FIG. 2 presents a block diagram of a thermal power management unit in accordance with some embodiments.

FIG. 2 presents a block diagram of thermal power management unit 118 in accordance with some embodiments. As is described above, thermal power management unit 118 is a functional block that performs operations for ensuring that entities in computing device 100 operate within thermal thresholds. As can be seen in FIG. 2, thermal power management unit 118 includes microcontroller 200, co-processor 202 (shown as "co-proc" 202 in FIG. 2), and history buffer 204. Thermal power management unit 118 is coupled to system manager 206.

Microcontroller 200 is a functional block that is configured to perform monitoring operations, data collection (e.g., via sensor signals 210 and/or other sensor signals), computations, control signaling (e.g., via control signal 208 and/or other control signals), device management, and/or other operations for ensuring that entities in computing device 100 operate within the thermal thresholds. These operations include selecting an idle state into which an entity (for this example, core 102) is to transition based on a predicted duration of an idle period for the entity. Microcontroller 200 may include one or more of a digital signal processor, a processor core, an embedded processor core or microcontroller, an application-specific circuit, a programmable logic circuit, etc.

Co-processor 202 is a functional block configured to offload some or all of the computation of the predicted duration of idle periods from microcontroller 200 (as described in more detail below). Co-processor 202 may include one or more of a digital signal processor, a processor core, an embedded processor core or microcontroller, an application-specific circuit (e.g., a fixed-function accelerator circuit), a programmable logic circuit, etc. In some embodiments, co-processor 202 includes general purpose circuits that are configured using program code (application code, firmware, etc.) to perform the operations herein described.

Although co-processor 202 is shown as a separate functional block, in some embodiments, co-processor 202 is implemented at least in part in dedicated processing circuits such as a compute unit or a simplified instruction execution pipeline in microcontroller 200. In some of these embodiments, the dedicated processing circuits in microcontroller 200 are separate from processing circuits in microcontroller 200 that perform general processing operations. In addition, in some embodiments, co-processor 202 is implemented using processing circuits in one or more of cores 102-106 (i.e., general purpose processing circuits in the cores are used to perform the computation of the predicted duration of idle periods).

History buffer 204 is a functional block that is configured to keep records of data related to idle period durations to be used in computing predicted durations for idle periods. In some embodiments, history buffer 204 includes memory circuits (e.g., registers, RAM, etc.) that are used for keeping the records of the data, along with control circuits used for handling the data. For example, in some embodiments, history buffer 204 includes memory circuits used for storing records of durations for a last x idle periods (where x is, e.g., 16, 25, or another value). In some embodiments, history buffer 204 also includes memory circuits used for storing metadata that is used for computing predicted durations of idle periods, verifying predictions, improving the accuracy of predictions, etc. For example, history buffer 204 may store metadata such as hardware and/or software sensor data associated with one or more idle periods, idle period duration prediction records, idle period counters, error records, historical coefficient records, etc.

In some embodiments, during operation, microcontroller 200 receives an indication from core 102 (e.g., on control signal 208) that an idle period has ended, along with a duration of the idle period (e.g., in µs) and possibly metadata related to the idle period. For example, core 102 may store the duration of the idle period and/or the metadata in a mailbox memory location in memory 108, and may then send an idle-period-over signal via control signal 208 to microcontroller 200. Microcontroller 200 then acquires the duration of the idle period and causes the duration of the idle period to be added as a record of the most recent idle period duration to history buffer 204 (e.g., replacing an oldest record when a maximum number of records are already present in history buffer 204). If metadata is provided, microcontroller 200 may also acquire the metadata and cause the metadata to be added to history buffer 204.

In some embodiments, microcontroller 200 next causes co-processor 202 to compute a predicted duration of a next idle period as result of a linear prediction using the durations of the idle periods from history buffer 204. For this operation, co-processor 202 may compute coefficients a(i) for the linear prediction using records of idle period durations from history buffer 204 (as described above). However, in embodiments where co-processor 202 only computes prediction coefficients every mth idle period, co-processor 202 may use previously-computed prediction coefficients (if they are available) instead of computing the prediction coefficients when the idle period is not an mth idle period. Using either the computed or the previously-computed coefficients and corresponding idle period durations, co-processor 202 then computes the predicted duration of the idle period using the linear prediction. Co-processor 202 next returns the predicted duration of the next idle period to microcontroller 200.

By having co-processor 202 perform the computation of the coefficients and the linear prediction as described, microcontroller 200 offloads computational work, which frees microcontroller 200 for performing other computational operations. Note that, in some embodiments, microcontroller 200 may offload additional operations and/or may not perform some of the operations described above. For example, in some embodiments, microcontroller 200 does not receive the signal from core 102. Instead, core 102 sends the signal to co-processor 202, which performs the described computations and then returns a result to microcontroller 200, which may then continue with the operations described below. However, in some embodiments, co-processor 202 and/or history buffer 204 are not present and microcontroller 200 itself performs the operations described above as being performed by co-processor 202 and/or history buffer 204.

Figure 3:
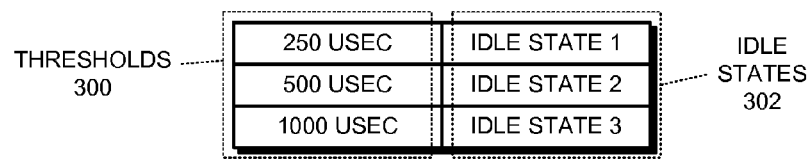
FIG. 3 presents a block diagram illustrating thresholds and idle states in accordance with some embodiments.

In some embodiments, microcontroller 200 uses the predicted duration of the next idle period to determine an idle state to which core 102 is to transition during a next idle period. To enable making the determination, microcontroller 200 may include/maintain a set of idle period duration thresholds, each of which is associated with at least one idle state. For example, microcontroller 200 may include one or more minimum duration thresholds, maximum duration thresholds, etc., each of which is associated with a corresponding idle state. FIG. 3 presents a block diagram illustrating thresholds 300 and idle states 302 in accordance with some embodiments. As can be seen in FIG. 3, microcontroller 200 includes thresholds 300 at 250 µs, 500 µs, and 1000 µs, along with corresponding idle states 302 (i.e., idle states 1-3). In these embodiments, if the predicted duration of the idle period is below 250 µs, microcontroller 200 causes core 102 to transition to idle state 1 during the next idle period, if the predicted idle period duration is above 250 µs, but below 500 µs, microcontroller 200 causes core 102 to transition to idle state 2 during the next idle period, etc. In other words, upon co-processor 202 computing a predicted duration for the next idle period of 250 µs or less for core 102 using the linear prediction, during the next idle period for core 102, microcontroller 200 causes core 102 to transition from a full power operating state (in which core 102 operates before the idle period) into idle state 1.

Idle states 302 can include any idle states supported by core 102. In some embodiments, longer predicted idle period durations/higher thresholds 300 may be associated with idle states that involve performing more architectural state preservation operations (e.g., copying values in registers, values in caches, state variables, etc. to disk, to a memory, to a lower-level cache, and/or to another location, etc.), as core 102 is predicted to be in the idle state for a sufficiently long duration to make the preservation operations worthwhile (in terms of the time, power, bus bandwidth, etc. consumed for performing the preservation operations). Similarly, in some embodiments, shorter idle period durations/lower thresholds 300 may be associated with idle states that involve performing less architectural state preservation operations. Thus, for shorter predicted idle period durations, an idle state with clock frequencies, voltages, currents, etc. sufficiently high to maintain architectural state in corresponding portions of core 102 may be selected so that at least some of the architectural state need not be preserved to enable transitioning to the idle state.

In some embodiments, causing core 102 to transition to a given idle state during the idle period includes setting one or more power-gating control values that control when one or more power-related operations are performed by the entity in the corresponding idle state. For example, in some embodiments, a cache-flush timer for core 102 may be set to a larger value (longer time) to prevent cache flushing for idle periods predicted to be of shorter duration and may be set to a smaller value to enable/cause quicker cache flushing for idle periods predicted to be of longer duration. Generally, in these embodiments, any variable or value that controls when an entity performs one or more power-saving and/or other operations can be set in accordance with the idle state to which the entity is to transition.

In some embodiments, one or more of the thresholds in thresholds 300 may be dynamically adjusted based on one or more factors for core 102, cores 104-106, computing device 100, etc. For example, thresholds 300 may be dynamically adjusted based on an operating state for core 102, cores 104-106, and/or computing device 100 (e.g., a clock frequency and/or voltage at full power, an operating system limit, a number of applications being executed, a number of busy entities in the computing device 100, etc.), an amount of architectural state to be copied to a memory and/or restored (e.g., modified data in caches in core 102, data in local memory circuits, etc.), prior idle period duration prediction errors, desired responsiveness of computing device 100, and/or other factors.

In some embodiments, microcontroller 200 and/or co-processor 202 use data collected from one or more functional blocks in addition to core 102 (via sensor signals 210) when computing the predicted duration of the next idle period. For example, in some embodiments, microcontroller 200 and/or co-processor 202 use data collected from memory 108, I/O devices 110, and/or power supply 112 such as temperature data, idleness data, I/O levels, number of communications with core 102, clock frequencies, voltage and current levels, etc. as an operational history of the other functional block(s). The operational history may be combined with data collected from core 102 to form an enhanced history. The enhanced history can then be used when computing the prediction of the duration of a next idle period, including adjusting or correcting a prediction made using the above-described linear prediction. For example, an I/O level just before each of a last y idle periods can be acquired from I/O devices 110 and/or a number of memory accesses just before each of a last y idle periods can be acquired from memory 108, and these values can be compared to present values to help determine if a prediction of a duration of an idle period is likely to be correct and, if not, by how much the predicted duration should be adjusted.

In some embodiments, thermal power management unit 118 receives, from system manager 206, configuration information that thermal power management unit 118 uses to configure itself and/or other functional blocks. For example, thermal power management unit 118 may receive configuration information such as idle period duration thresholds, updates to the linear prediction expression, idle states to be used for given thresholds, etc. In some embodiments, system manager 206 is located outside computing device (e.g., is connected to computing device via an external connection, via a network connection, etc.). In some embodiments, system manager 206 is located inside of computing device, such as in a support processor, a system management unit, etc.

In some embodiments, after the next idle period occurs for core 102, microcontroller 200 determines if the predicted duration and the actual duration were close to each other (e.g., were within a threshold number of μs of each other) and thus if the predicted duration was correct. If not, microcontroller 200 can update the prediction coefficients immediately (instead, for example, of waiting for an mth idle period, as described above). Note that, if the predicted duration is incorrect, e.g., is longer than the actual idle period, etc., core 102 may transition to a suboptimal idle state for core 102 to transition into and back out of (i.e., an idle state that is inefficient in terms of time, electrical power, etc.), but computing device 100 experiences no incorrect operation or errors/faults due to the selection of a suboptimal idle state.

Although thermal power management unit 118 (or functional blocks therein) is described herein as performing various operations, in some embodiments, different functional blocks perform some or all of the operations. For example, in some embodiments, an operating system or a monitoring application executing in computing device 100 performs some or all of the operations. In these embodiments, the operating system or application can interact with thermal power management unit 118 or another functional block for acquiring idle period duration history, idle states, thresholds, etc. For example, in some embodiments, a larger number of idle period durations and/or prediction coefficients are used and thus the operating system or the monitoring application performs computational operations and/or other operations (instead of having a large number of circuits in thermal power management unit 118 for performing the operations).

In addition, although FIG. 2 shows some of the functional blocks that are shown in FIG. 1, some functional blocks (e.g., cores 104-106) are not shown for clarity. In addition, buses 114 and 116 are not shown (control signals 208 and/or sensor signals 210 may be included as part of bus 114). Generally, the operations described for FIG. 2 may be performed using any combination of functional blocks that can perform the operations herein described and for any entity for which predicted idle period durations can be computed and which can be caused to transition into a corresponding idle state.

Processing Idle Period Durations

In some embodiments, one or both of co-processor 202 and microcontroller 200 processes (or "filters") the durations of one or more previous idle periods to adjust the durations before the computation of the prediction coefficients and/or the predicted duration of the next idle period. For example, during the computation of the prediction coefficients and/or the linear prediction, relatively large or small idle period durations can be removed/ignored, set to specified values (i.e., set to a minimum or maximum value, etc.), adjusted by a given percentage (e.g., cut in half), adjusted in accordance with one or more other previous values (e.g., set to a moving average, a maximum/minimum, a mean, etc.), set to one of two or more quantized values, and/or otherwise adjusted. By processing the previous idle period durations in this way, co-processor 202 and/or microcontroller 200 can reduce the effect of anomalously large or small idle period durations on the computation using the linear prediction.

Using Linear Prediction to Determine an Idle State for an Entity

Figure 4:
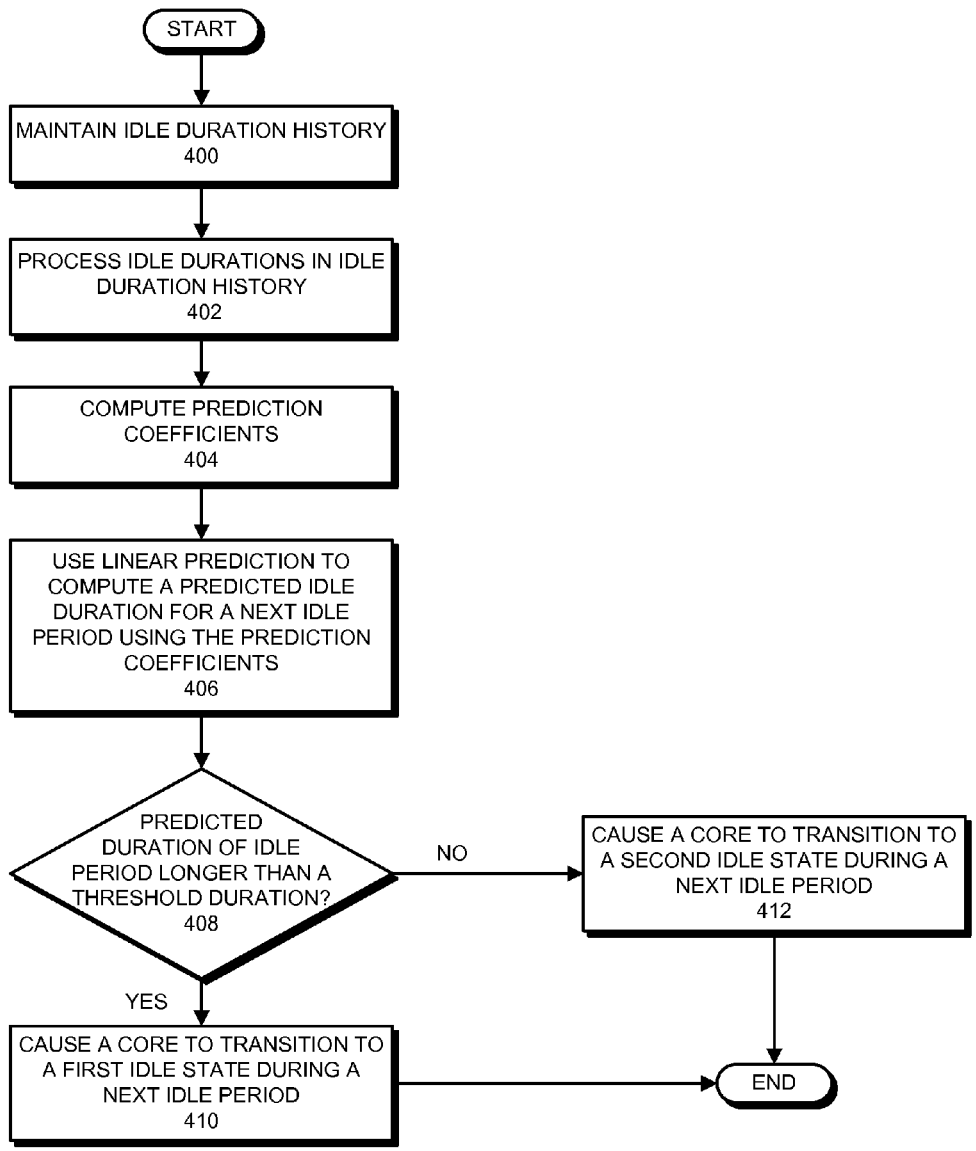
FIG. 4 presents a flowchart illustrating a process for using linear prediction to determine an idle state for an entity in a computing device in accordance with some embodiments.

FIG. 4 presents a flowchart illustrating a process for using linear prediction to determine an idle state for an entity in a computing device (i.e., core 102) in accordance with some embodiments. More specifically, in FIG. 4, a process is shown in which thermal power management unit 118 uses a linear prediction based on one or more previous idle periods for core 102 to predict a duration of a next idle period for core 102. Based on the predicted duration of the next idle period, thermal power management unit 118 determines an idle state to which core 102 is to transition during the next idle period.

Note that the operations shown in FIG. 4 are presented as a general example of operations performed by some embodiments. The operations performed by other embodiments include different operations and/or operations that are performed in a different order. Additionally, although certain mechanisms (thermal power management unit 118, core 102, etc.) are used in describing the operations, in some embodiments, other mechanisms can perform the operations. For example, in some embodiments, a core such as core 102 or 104 performs the operations described as being performed by thermal power management unit 118. As another example, in some embodiments, the idle state is determined for an entity other than core 102 (e.g., core 104 or 106, etc.).

The process shown in FIG. 4 starts when thermal power management unit 118 maintains an idle duration history (step 400). In some embodiments, this operation includes receiving (e.g., from core 102 and/or another functional block in computing device 100), acquiring, computing, keeping track of, etc. durations for a number of idle periods for core 102. For example, in some embodiments, for each idle period, thermal power management unit 118 receives data on sensor signals 210 (e.g., I/O rate data, memory read/write rate data, instruction execution data, idle period data, etc.) from one or more other functional blocks in computing device 100 and uses the data to determine that the idle period has occurred and how long the duration of the idle period was. As another example, in some embodiments, thermal power management unit 118 receives an indication of the actual duration of each idle period from a functional block in computing device 100 (e.g., core 102). Thermal power management unit 118 then adds a record of each idle period duration to the history buffer 204 (e.g., replacing an oldest record when a maximum number of records are already present in history buffer 204), thereby maintaining the idle duration history.

Next, thermal power management unit 118 processes the idle durations in the idle duration history (step 402). In some embodiments, this operation includes retrieving idle period durations from history buffer 204 and processing (or "filtering") the durations of one or more previous idle periods to adjust the durations before the computation of the prediction coefficients and/or the predicted duration of the next idle period as described above. In some embodiments, instead of retrieving idle period durations from history buffer 204, thermal power management unit 118 processes the idle period durations as each is received/determined (perhaps based on one or more values computed from previous idle period durations, e.g., averages, etc.). In these embodiments, the record added to history buffer 204 for each idle period (in step 400) is already processed.

Thermal power management unit 118 then computes prediction coefficients a(i) for the linear prediction (step 404). This operation includes computing the prediction coefficients using a dedicated hardware circuit (i.e., a hardware circuit that implements the operations used for computing the prediction coefficient) and/or using program code executed by general purpose circuits in co-processor 202. As described above, in some embodiments, thermal power management unit 118 computes prediction coefficients for/after each idle period using the idle period duration for the idle period as well as previous idle period durations from history buffer 204. However, in some embodiments, thermal power management unit 118 computes the prediction coefficients every mth idle period using the idle period duration for the mth idle period as well as previous idle period durations from history buffer 204.

Next, thermal power management unit 118 uses linear prediction to compute a predicted idle duration for a next idle period using the prediction coefficients (step 406). Thermal power management unit 118 then determines if the predicted duration of the idle period is longer than a threshold duration (step 408). For example, in some embodiments, thermal power management unit 118 has one threshold duration (e.g., 500 µs) and thermal power management unit 118 determines if the predicted duration for the idle period is longer than the threshold duration.

In the embodiments described for FIG. 4, core 102 supports at least two idle states: (1) a first idle state in which core 102 is configured to set at least one operating parameter (e.g., voltage, current, clock frequency, etc.) for circuits (e.g., register files, caches, memory elements, dynamic circuits, etc.) that maintain at least some of the architectural state of core 102 to a level that is insufficient to maintain the architectural state, and (2) a second idle state in which core 102 is configured to set at least one operating parameter for the circuits that maintain at least some of the architectural state of core 102 to a level that is sufficient to maintain the architectural state. For example, one or more voltages may be set to 0 V in the first idle state, but may be maintained at 1.2 V, 1.5 V, and/or other voltages in the second idle state. In these embodiments, any architectural state that is to be used upon transitioning back out of the first idle state should be preserved before transitioning into the first idle state (the preservation of architectural state is described above). Preserving the architectural state has a cost in terms of the time taken to preserve the architectural state and recover the architectural state (when subsequently exiting the idle state), the power consumed when performing the operations to preserve the architectural state and recover the architectural state, the use of bandwidth on buses, in memory 108, etc. in computing device 100, the business of core 102 when performing the operations to preserve the architectural state and recover the architectural state, and/or other aspects of performing the operations to preserve the architectural state and recover the architectural state. Generally, the threshold duration is set such that the cost of entering the first idle state is at least offset by the benefits of transitioning to the first idle state during the next idle period, where the benefits of transitioning to the first idle state are power savings, cooling of the processor, reduced load on buses in computing device 100, etc. In some embodiments, averages, estimates, approximations, etc. of the various costs are used to determine a duration for the threshold. For example, in some embodiments, the time taken to preserve the architectural state and recover the architectural state may be used as an initial value for the threshold and then adjustments may be made for the other costs (e.g., to offset power consumption, etc.). However, in some embodiments, the threshold is generally not be less than the time taken to preserve the architectural state and recover the architectural state, as core 102 might be delayed (if the predicted duration is correct) simply waiting for the transition into and back out of the first idle state.

If the predicted duration of the idle period is longer than the threshold duration (step 408), thermal power management unit 118 causes core 102 to transition to the first idle state during the next idle period (step 410). For example, thermal power management unit 118 can set a flag in a register, signal core 102, respond to an inquiry message from core 102, and/or otherwise cause core 102 to transition to the first idle state during the next idle period. As described above, for the first idle state, any architectural state that is to be used upon transitioning back out of the first idle state should be preserved before transitioning into the first idle state.

If the predicted duration of the idle period is shorter than the threshold duration (step 408), thermal power management unit 118 causes core 102 to transition to the second idle state during the next idle period (step 412). For example, thermal power management unit 118 can set a flag in a register, signal core 102, respond to an inquiry message from core 102, and/or otherwise cause core 102 to transition to the first idle state during the next idle period.

In some embodiments, a computing device (e.g., computing device 100 and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/CPUs, application-specific integrated circuit (ASIC) chips, field-programmable gate arrays (FPGAs), caches/cache controllers, compute units, embedded processors, GPUs/graphics cores, pipelines, APUs, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits (e.g., processing circuits, logic circuits, control circuits, etc.) that perform the described operations. In some embodiments, functional blocks include general purpose circuits (e.g., pipelines, compute units, etc.) that execute program code (e.g., microcode, firmware, applications, etc.) and/or may be configured to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for operating a computing device, comprising:
   in a thermal power management unit in the computing device, performing operations for:
      for each of one or more previous idle periods, acquiring a duration of the previous idle period and computing a set of coefficients for a linear prediction based on the durations of the one or more previous idle periods;
      using the set of coefficients in the linear prediction to compute a predicted duration of a next idle period for an entity in the computing device based on one or more previous idle periods for the entity;
      based on the predicted duration of the next idle period, configuring the entity to operate in a corresponding idle state during the next idle period; and
      based on an accuracy of the predicted duration of the next idle period, adjusting a number of previous idle periods to be used for computing sets of coefficients for one or more subsequent computations of the predicted durations of idle periods.

2. The method of claim 1, wherein computing the set of coefficients for the linear prediction comprises:
   when the next idle period is a first idle period in a set of two or more idle periods, computing the set of coefficients for the linear prediction; and
   when the next idle period is not the first idle period in the set of two or more idle periods, using previously-computed coefficients for the linear prediction.

3. The method of claim 1, further comprising:
   before computing the set of coefficients, processing the durations of one or more of the previous idle periods to adjust relatively large or small durations.

4. The method of claim 1, wherein computing the set of coefficients for the linear prediction based on the durations of the one or more previous idle periods comprises using a closed-form solution to compute the set of coefficients.

5. The method of claim 1, wherein, based on the predicted duration of the next idle period, configuring the entity to operate in the corresponding idle state comprises:
   determining a relationship of the predicted duration of the next idle period to one or more thresholds, the thresholds associated with corresponding idle states; and
   based on the determined relationship, causing the entity to operate in one of the corresponding idle states.

6. The method of claim 5, wherein causing the entity to operate in a corresponding idle state comprises:
   setting one or more power-gating control values, the power-gating control values controlling when one or more power-related operations are performed by the entity in the corresponding idle state.

7. A computing device, comprising:
   a thermal power management unit; and
   an entity coupled to the thermal power management unit;
   wherein the thermal power management unit is configured to:
      for each of one or more previous idle periods, acquire a duration of the previous idle period and compute a set of coefficients for a linear prediction based on the durations of the one or more previous idle periods;
      use the set of coefficients in the linear prediction to compute a predicted duration of a next idle period for the entity based on one or more previous idle periods for the entity;
      based on the predicted duration of the next idle period, configure the entity to operate in a corresponding idle state during the next idle period; and
      based on an accuracy of the predicted duration of the next idle period, adjust a number of previous idle periods to be used for computing sets of coefficients for one or more subsequent computations of the predicted durations of idle periods.

8. The computing device of claim 7, wherein, when computing the set of coefficients for the linear prediction, the thermal power management unit is configured to:
   when the next idle period is a first idle period in a set of two or more idle periods, compute the set of coefficients for the linear prediction; and
   when the next idle period is not the first idle period in the set of two or more idle periods, use previously-computed coefficients for the linear prediction.

9. The computing device of claim 7, wherein the thermal power management unit is configured to:
   before computing the set of coefficients, process the durations of one or more of the previous idle periods to adjust relatively large or small durations.

10. The computing device of claim 7, wherein, when computing the set of coefficients for the linear prediction based on the durations of the one or more previous idle periods, the thermal power management unit is configured to use a closed-form solution to compute the set of coefficients.

11. The computing device of claim 7, wherein, when, based on the predicted duration of the next idle period, configuring the entity to operate in the corresponding idle state, the thermal power management unit is configured to:
   determine a relationship of the predicted duration of the next idle period to one or more thresholds, the thresholds associated with corresponding idle states; and
   based on the determined relationship, cause the entity to operate in one of the corresponding idle states.

12. The computing device of claim 11, wherein, when causing the entity to operate in a corresponding idle state the thermal power management unit is configured to:
   set one or more power-gating control values, the power-gating control values controlling when one or more power-related operations are performed by the entity in the corresponding idle state.

13. A non-transitory computer-readable storage medium storing instructions that, when executed by a computing device, cause the computing device to perform a method for configuring an entity to operate in an idle state, the method comprising:
   for each of one or more previous idle periods, acquiring a duration of the previous idle period and computing a set of coefficients for a linear prediction based on the durations of the one or more previous idle periods;
   using the set of coefficients in the linear prediction to compute a predicted duration of a next idle period for an entity in the computing device based on one or more previous idle periods for the entity;
   based on the predicted duration of the next idle period, configuring the entity to operate in a corresponding idle state during the next idle period; and
   based on an accuracy of the predicted duration of the next idle period, adjusting a number of previous idle periods to be used for computing sets of coefficients for one or more subsequent computations of the predicted durations of idle periods.

14. The computer-readable storage medium of claim 13, wherein computing the set of coefficients for the linear prediction based on the durations of the one or more previous idle periods comprises using a closed-form solution to compute the set of coefficients.

15. The computer-readable storage medium of claim 13, wherein, based on the predicted duration of the next idle period, configuring the entity to operate in the corresponding idle state comprises:
   determining a relationship of the predicted duration of the next idle period to one or more thresholds, the thresholds associated with corresponding idle states; and
   based on the determined relationship, causing the entity to operate in one of the corresponding idle states.

* * * * *